(12) United States Patent
Tange et al.

(10) Patent No.: US 10,441,902 B2
(45) Date of Patent: Oct. 15, 2019

(54) STRAINER

(71) Applicant: YAMASHIN-FILTER CORP., Kanagawa (JP)

(72) Inventors: Takazumi Tange, Kanagawa (JP); Hideo Nakaoka, Kanagawa (JP); Masanori Wakabayashi, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 37 days.

(21) Appl. No.: 15/702,115

(22) Filed: Sep. 12, 2017

(65) Prior Publication Data

US 2018/0001235 A1 Jan. 4, 2018

Related U.S. Application Data (63) Continuation of application No. PCT/JP2016/060325, filed on Mar. 30, 2016.

(30) Foreign Application Priority Data

Apr. 3, 2015 (JP) ................ 2015-076633

(51) Int. Cl.
  *B01D 29/11* (2006.01)
  *B01D 35/02* (2006.01)
  (Continued)

(52) U.S. Cl.
  CPC ............ *B01D 29/11* (2013.01); *B01D 29/117* (2013.01); *B01D 29/902* (2013.01); *B01D 35/02* (2013.01);
  (Continued)

(58) Field of Classification Search
  CPC combination set(s) only.
  See application file for complete search history.

(56) References Cited

U.S. PATENT DOCUMENTS 4,924,923 A * 5/1990 Boehmer ............... B60K 15/04
  141/312
6,990,998 B1 * 1/2006 Amellal ............. B01D 35/0273
  137/547

(Continued)

FOREIGN PATENT DOCUMENTS

CN 1541746 A 11/2004
DE 3310711 A1 9/1984

(Continued)

OTHER PUBLICATIONS

Supplementary Partial European Search Report issued in European Patent Application No. 16772929.2 dated Apr. 17, 2018 (13 pages).

(Continued)

*Primary Examiner* — Binh Q Tran
(74) *Attorney, Agent, or Firm* — Nakanishi IP Associates, LLC (57) ABSTRACT

A strainer is provided in an interior of an injection pipe serving as an injection opening through which a liquid containing a reducing agent is injected into a tank body. In the strainer, a front end portion, having a substantially triangular or substantially trapezoidal shape when a cross section is taken along a plane including an axis of a strainer body having a substantially cylindrical shape, is formed integrally with a front end of the strainer body.

6 Claims, 6 Drawing Sheets

(51) Int. Cl.
  *F01N 3/20* (2006.01)
  *B01D 29/90* (2006.01)
  *B01D 53/90* (2006.01)
  *B01D 53/94* (2006.01)
(52) U.S. Cl.
  CPC ........... *B01D 53/90* (2013.01); *F01N 3/2066* (2013.01); *B01D 53/9418* (2013.01); *B01D 2201/02* (2013.01); *B01D 2251/2067* (2013.01); *F01N 2610/02* (2013.01); *F01N 2610/1426* (2013.01); *Y02T 10/24* (2013.01)

(56) References Cited

U.S. PATENT DOCUMENTS

| | | | |
|---|---|---|---|
| 9,394,157 B2* | 7/2016 | Kito | B67D 7/42 |
| 9,694,675 B2* | 7/2017 | Sekihara | B60K 15/04 |
| 10,005,009 B2* | 6/2018 | Qureshi | B01D 35/027 |
| 2003/0183587 A1 | 10/2003 | Hawkins | |
| 2004/0226868 A1 | 11/2004 | Shoji et al. | |
| 2006/0107638 A1* | 5/2006 | Holzmann | B01D 46/0005 55/498 |
| 2011/0192140 A1 | 4/2011 | Olivier et al. | |
| 2013/0092290 A1* | 4/2013 | Waymire | B60K 15/0403 141/286 |

FOREIGN PATENT DOCUMENTS

| | | |
|---|---|---|
| DE | 102008056041 A1 | 5/2010 |
| EP | 1289624 A1 | 3/2003 |
| JP | S55-157310 A | 12/1980 |
| JP | S55-167414 U | 12/1980 |
| JP | S58-27612 A | 2/1983 |
| JP | S59-13790 U | 1/1984 |
| JP | S59-176619 U | 11/1984 |
| JP | S61-192316 A | 8/1986 |
| JP | H03-123925 U | 12/1991 |
| JP | 2009-183012 A | 8/2009 |
| JP | 2013-519822 A | 5/2013 |
| JP | 569316 B | 1/2015 |
| JP | 2015-121102 A | 7/2015 |
| WO | 01/093982 A1 | 12/2001 |

OTHER PUBLICATIONS

Notice of Reasons for Rejection issued in Japanese Patent Application No. JP2015-076633 dated Sep. 18, 2018 (9 pages).
Written Opinion of International Searching Authority issued in PCT/JP2016/060325, dated Jun. 21, 2016, with English Translation (13 pages).
International Search Report issued in PCT/JP2016/060325, dated Jun. 21, 2016, with translation (7 pages).
Written Opinion of International Searching Authority issued in PCT/JP2016/060325, dated Jun. 21, 2016 (6 pages).
Office Action issued in Chinese Patent Application No. 201680014655.1 dated May 24, 2019 with English Translation (10 pages).

* cited by examiner

STRAINER

CROSS-REFERENCE TO RELATED APPLICATIONS

This application is a continuation application of the International Patent Application No. PCT/JP2016/060325 filed on Mar. 30, 2016, which claims priority to Patent Application No. JP2015-076633 filed before the Japan Patent Office on April 3, 2015, the entire contents of which are incorporated by reference.

TECHNICAL FIELD

The present invention relates to a strainer.

BACKGROUND ART

In Patent Document 1, there is disclosed a selective catalytic reduction (SCR) system in which a urea aqueous solution in a urea aqueous solution tank is passed through a strainer and a filter, and suctioned into a urea aqueous solution pump disposed in the urea aqueous solution tank.

CITATION LIST

Patent Document

Patent Document 1: JP-A-2009-183012

In an internal combustion engine (a diesel engine, in particular) applied to an automobile or the like, a urea-SCR system that reduces NOx (nitrogen oxide) in exhaust is used. In this urea-SCR system, an SCR catalyst that causes nitrogen oxide (NOx) to react with a reducing agent is provided midway in an exhaust pipe through which exhaust gas flows. The NOx in the exhaust gas is selectively adsorbed by the SCR catalyst and injected into a urea aqueous solution in the exhaust pipe on the SCR catalyst upstream side. Then, ammonia, serving as a reducing agent, is supplied to the SCR catalyst, and the NOx absorbed by the SCR catalyst is reduced, decomposed into nitrogen and water, and discharged, thereby reducing the emissions concentration of NOx.

In such a urea-SCR system as described in Patent Document 1, a sensor unit that includes various sensors, a filter, and the like is provided in the urea aqueous solution tank. Removal of this sensor unit from the urea aqueous solution tank for maintenance, however, is costly and time-consuming, resulting in the desire to remove any dust that exists in the urea aqueous solution by a filter in the urea aqueous solution tank, upstream. Yet, when the dust is removed during tank injection, for example, the possibility of blow-back of the urea aqueous solution exists.

SUMMARY OF INVENTION

One or more aspects of the present invention are directed to a strainer that prevents blow-back of a urea aqueous solution.

A strainer according to an aspect of the present invention is, for example, provided in an interior of an injection pipe. The injection pipe serves as an injection opening through which a liquid containing a reducing agent is injected into a tank body, and includes a first end that communicates with an interior of the tank body and a second end provided outside the tank body. The strainer includes a strainer body having a substantially cylindrical shape, and a front end portion having a substantially triangular or substantially trapezoidal shape when a cross section is taken along a plane including an axis of the strainer body. The front end portion is integrally formed with an end of the strainer body on a side disposed in a position far away from the second end.

According to the strainer of an aspect of the present invention, the front end portion, having a substantially triangular or substantially trapezoidal shape when a cross section is taken along a plane including the axis of the strainer body having a substantially cylindrical shape, is integrally formed with the front end of the strainer body. The front end portion makes it possible to prevent blow-back of a urea aqueous solution.

Here, the front end portion may be formed using a material through which the liquid cannot pass and protruding toward a hollow portion of the strainer body. The urea aqueous solution is thus introduced into a side surface of the strainer body and flows out from the side surface so as to spread to the outside, thereby making it possible to prevent blow-back of the urea aqueous solution.

Here, the front end portion may include a frame formed using a material through which the liquid cannot pass, and a screen portion formed using a material through which the liquid can pass, and may be formed protruding to a side opposite to the strainer body. The urea aqueous solution thus flows out from the screen portion of the front end portion, thereby making it possible to prevent blow-back of the urea aqueous solution.

According to one or more aspects of the present invention, it is possible to prevent blow-back of a urea aqueous solution.

DESCRIPTION OF EMBODIMENTS

Below, detailed description will be given according to embodiments of the present invention with reference to the drawings.

First Embodiment

Figure 1:
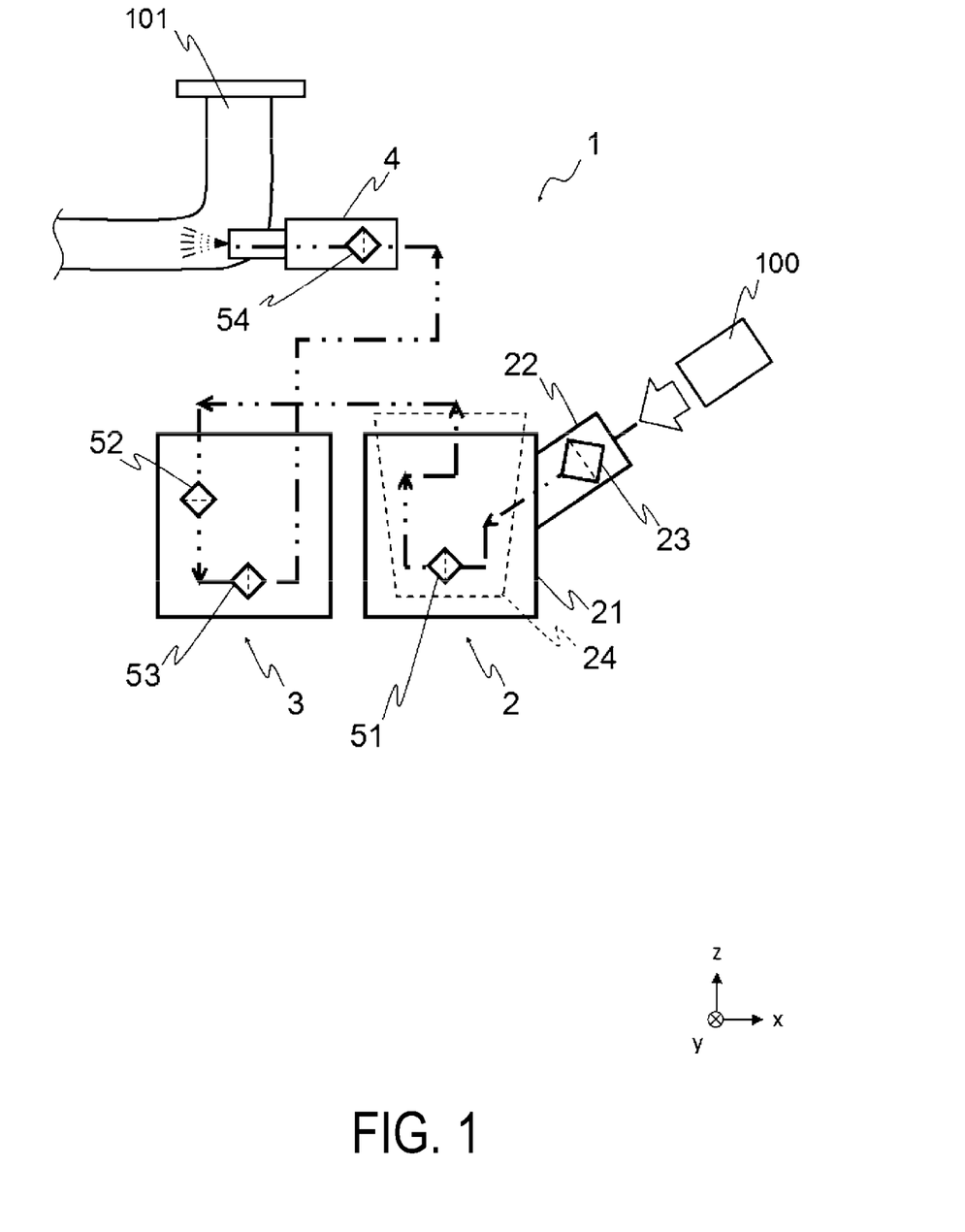
FIG. 1 is an overall configuration diagram illustrating an overall configuration of a urea-SCR system 1 according to a first embodiment of the present invention.

FIG. 1 is an overall configuration diagram illustrating an overall configuration of a urea-SCR system according to a first embodiment of the present invention. In FIG. 1, the two-dot chain line schematically indicates the flow of a urea aqueous solution.

A urea-SCR system 1 mainly includes an exhaust portion that discharges exhaust from an engine of an automobile (not illustrated), and a urea aqueous solution supply portion.

The exhaust portion mainly includes a continuous regeneration type particulate matter (PM) removal filter (not illustrated) that collects PM that exists in the exhaust, an exhaust pipe 101, a catalyst (not illustrated) that promotes an NOx reduction reaction and purifies the exhaust, and an exhaust pipe (not illustrated), in that order from the exhaust upstream side.

An aqueous solution that includes ammonia serving as an NOx reducing agent (hereinafter "urea aqueous solution") is injected and supplied from an injection nozzle 4 to the exhaust pipe 101. The urea aqueous solution is mixed with exhaust and supplied to a catalyst.

The urea aqueous solution supply portion mainly includes a urea aqueous solution tank 2, a pump 3, and the injection nozzle 4.

The urea aqueous solution tank 2 is a sealed container with a cap 25 (refer to FIG. 2), and a urea aqueous solution of a predetermined concentration is stored in the interior thereof. The urea aqueous solution tank 2 mainly includes a tank body 21, an injection pipe 22, a strainer 23, and a sensor unit 24. A water supply gun 100 serving as a supply member that supplies the urea aqueous solution to the tank body 21 is attached to the injection pipe 22. The urea aqueous solution tank 2 will be described in detail later.

The pump 3 is an electric pump rotationally driven by a drive signal from a controller (not illustrated). The urea aqueous solution tank 2 and the pump 3 are connected to each other by a pipe (not illustrated). Further, the pump 3 and the injection nozzle 4 are connected to each other by a pressure feed pipe (not illustrated). When the pump 3 is driven, the urea aqueous solution inside the urea aqueous solution tank 2 is suctioned into the pump 3 and pressure fed to the injection nozzle 4 after a discharge pressure is adjusted.

In the injection nozzle 4, a needle valve (not illustrated) that opens and closes an injection opening (not illustrated) is opened by an electromagnetic actuator (not illustrated), thereby atomizing and injecting the urea aqueous solution into the exhaust pipe 101.

The urea aqueous solution tank 2 is provided with a filter 51, and the pump 3 is provided with filters 52, 53. Further, the injection nozzle 4 is provided with a filter 54.

Figure 2:
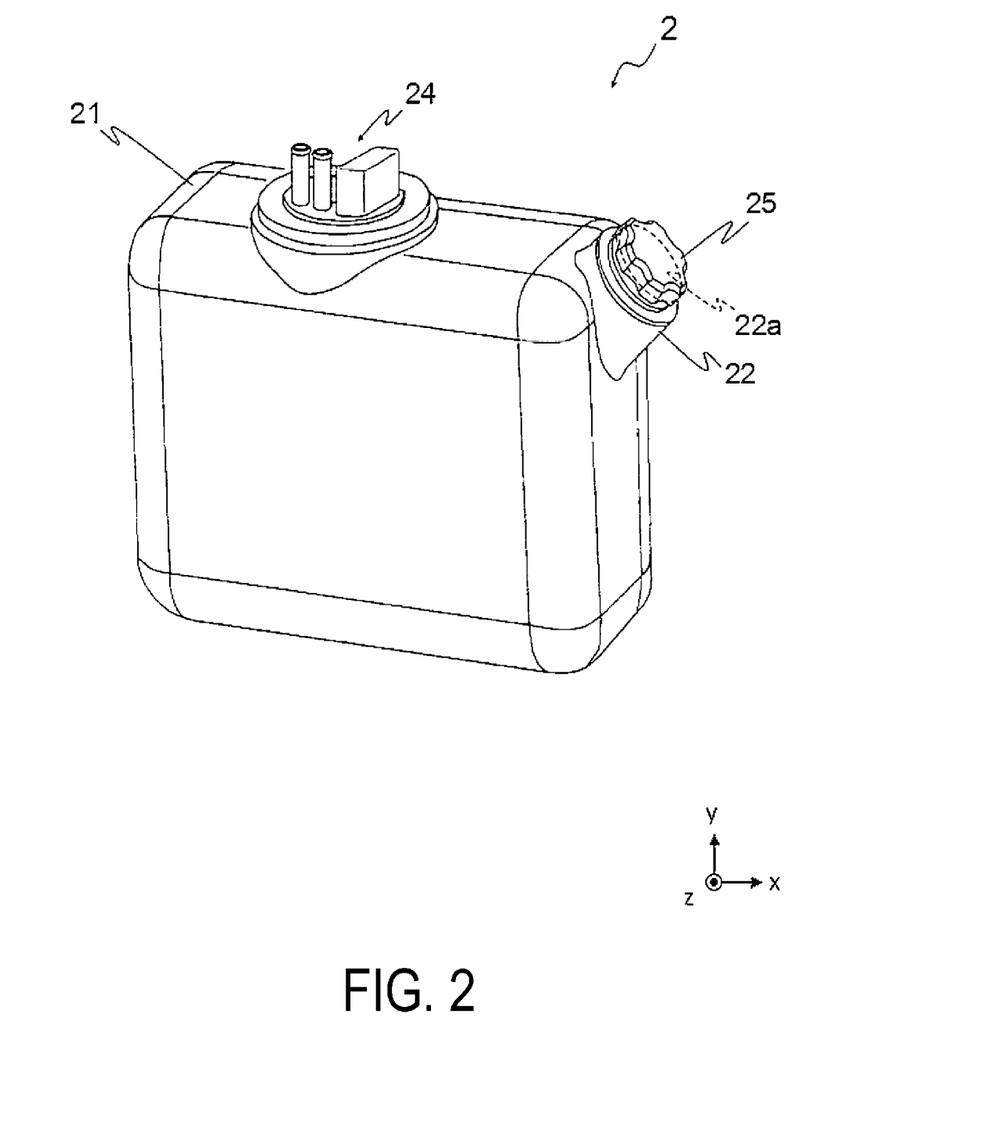
FIG. 2 is a perspective view illustrating an overview of a urea aqueous solution tank 2.

Next, the urea aqueous solution tank 2 will be described. FIG. 2 is a perspective view illustrating an overview of the urea aqueous solution tank 2.

The tank body 21 is formed from a resin material superior in corrosion resistance, such as polyethylene, or a metal such as stainless steel. The injection pipe 22 that serves as an injection opening through which the urea aqueous solution is injected into the urea aqueous solution tank is provided near an upper end of a side surface of the tank body 21. A drain hole (not illustrated) that discharges the urea aqueous solution during maintenance is provided to a bottom surface of the tank body 21. Further, the sensor unit 24 is provided to the tank body 21. This sensor unit 24 integrates various sensors including a concentration sensor, and a liquid level sensor for verifying the liquid level during injection, a urea aqueous solution supply pipe, and pipes for supplying cooling water from a radiator to a urea aqueous solution thawing device inside the tank.

The injection pipe 22 is a tubular member with one end (a base) communicating with the interior of the tank body 21, and the other end (a front end 22a) provided outside the tank body 21. The injection pipe 22 is formed from a resin material superior in corrosion resistance, such as polyethylene, or a metal such as stainless steel. Note that the base of the injection pipe 22, as long as in communication with the interior of the tank body 21, may be integrated with the tank body 21 or positioned in the interior of the tank body 21.

The cap 25 is provided to the front end 22a. The water supply gun 100 (refer to FIG. 1) is attached to the front end 22a with the cap 25 removed from the front end 22a. A permanent magnet (not illustrated) is provided to the front end 22a. A sensor (not illustrated) that operates by a magnetic field of the permanent magnet is provided to the water supply gun 100. When the water supply gun 100 is attached to the injection pipe 22, the sensor operates, causing an inflow valve provided to the water supply gun 100 to open. As a result, improper water supply is prevented. Note that the configuration for improper water supply prevention is not limited to this configuration.

The strainer 23 (refer to FIG. 1) that removes solid components from the urea aqueous solution supplied from the water supply gun 100 is provided to the interior of the injection pipe 22. The strainer 23 is for preventing clogging of the filter 51. In the present embodiment, the filtration precision of the strainer 23 is substantially the same as that of the filter 51.

Figure 3:
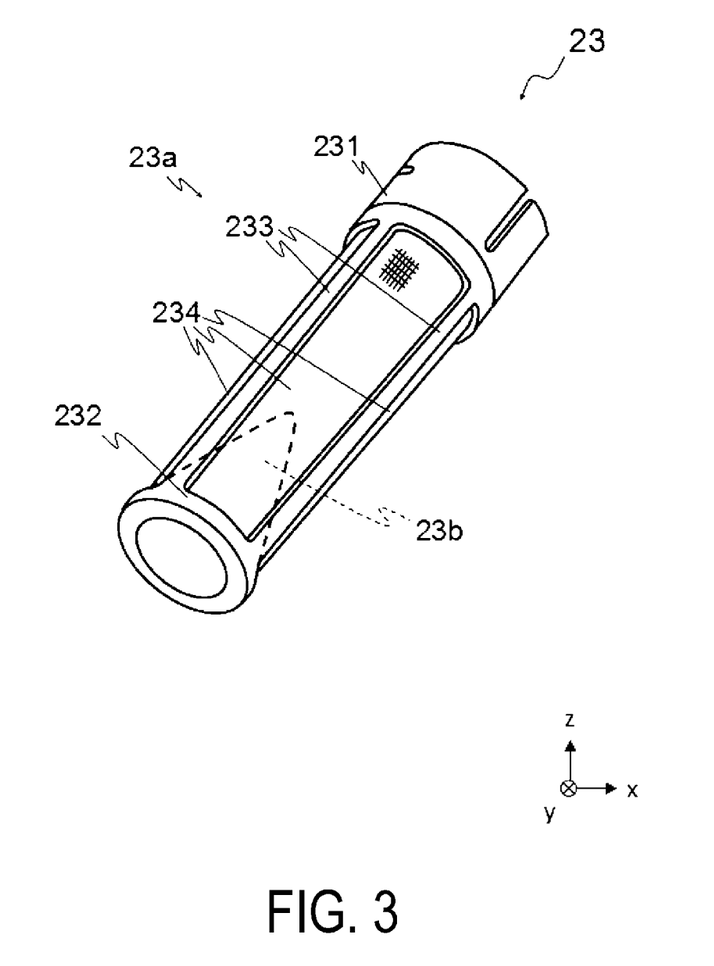
FIG. 3 is a perspective view illustrating an overview of a strainer 23.
Figure 4:
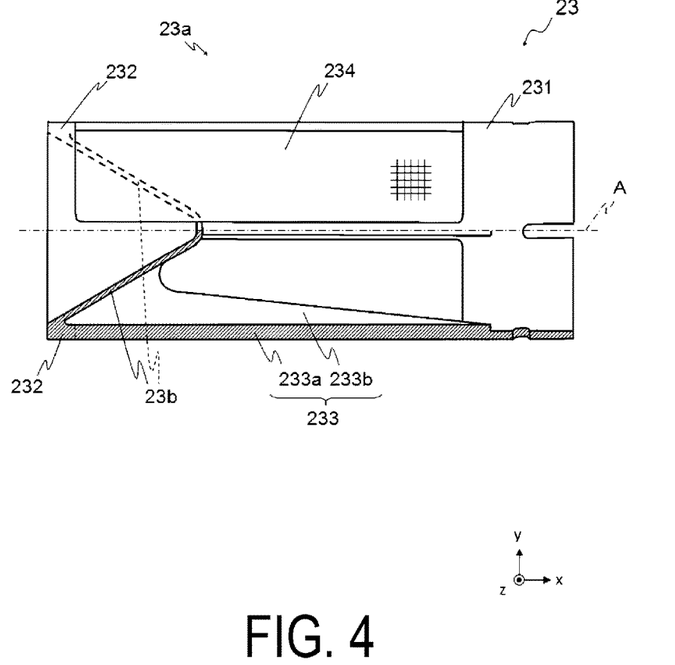
FIG. 4 is a side view and a cross-sectional view of the strainer 23.

Below, detailed description will be given of the strainer 23. FIG. 3 is a perspective view illustrating an overview of the strainer 23. FIG. 4 is a side view and a cross-sectional view of the strainer 23. In FIG. 4, the area above the center axis A is a side view, and the area below the center axis is a cross-sectional view. Further, while the border between a front end tube 232 and a pillar portion 233 is schematically indicated by a dashed line in the cross-sectional view of FIG. 4, this is for explanatory purposes. In actuality, the two are continually connected.

The strainer 23 mainly includes a strainer body 23a having a substantially cylindrical shape, and a front end portion 23b provided to the strainer body 23a.

The strainer body 23a includes an attaching portion 231 having a tubular shape, the front end tube 232, the pillar portion 233, and a screen portion 234.

The attaching portion 231 and the front end tube 232 have substantially cylindrical shapes. The attaching portion 231 is used to provide the strainer body 23a to the hollow portion of the injection pipe 22. The attaching portion 231 serves as an inlet for the urea aqueous solution, and the front end tube 232 serves as an outlet for the urea aqueous solution. Note that the attaching portion 231 may be provided to the interior of the injection pipe 22 via an adapter or the like (not illustrated).

The pillar portion 233 is a substantially pillar-shaped member that connects the attaching portion 231 and the front end tube 232. In the pillar portion 233, a rib 233b having a plate shape is integrally formed with a pillar 233a having a rod shape. The attaching portion 231, the front end tube 232, and the pillar portion 233 are integrally formed using a resin or the like.

The screen portion 234 is a fabric-like member obtained by weaving a wire material into a mesh shape, and is provided so as to cover a space defined by the attaching portion 231, the front end tube 232, and the pillar portion 233. The screen portion 234 is formed using a resin such as nylon.

Note that when the strainer 23 is provided inside the injection pipe 22, the attaching portion 231 is disposed in a position near the front end 22a, and the front end tube 232 is disposed in a position far away from the front end 22a. Further, when the strainer 23 is provided inside the injection pipe 22, the front end tube 232 may be positioned in the interior of the tank body 21.

The front end portion 23b has a substantially truncated cone shape, and a cross section thereof taken along the plane including the center axis A of the strainer 23 has a substantially triangular shape. The front end portion 23b is integrally formed with the front end tube 232 so as to protrude toward the hollow portion of the strainer body 23a. That is, the front end (the vertex of the substantially truncated cone shape) of the front end portion 23b is positioned in the interior of the strainer body 23a.

The front end portion 23b is formed using a material through which the urea aqueous solution cannot pass. As a result, the urea aqueous solution is introduced into the screen portion 234 on the side surface of the strainer body 23a.

Figure 5:
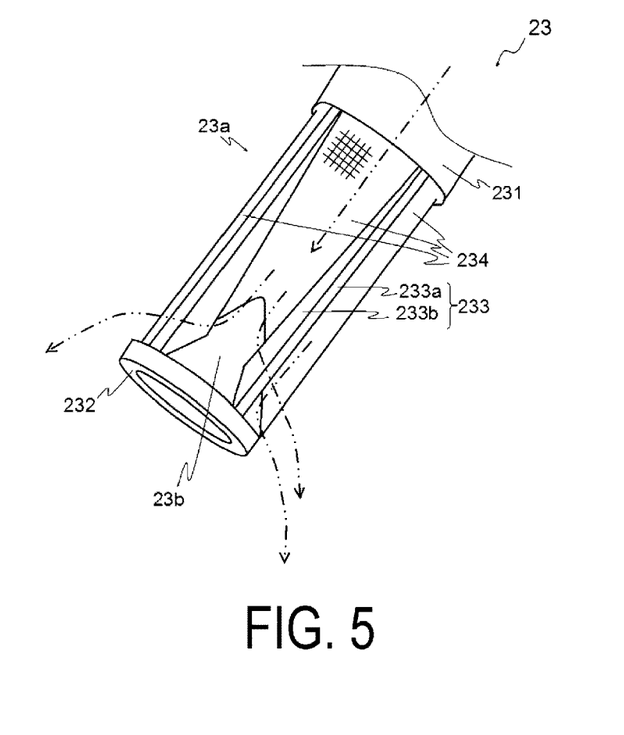
FIG. 5 is a diagram illustrating how a urea aqueous solution flows out from the strainer 23.

FIG. 5 is a diagram illustrating how the urea aqueous solution flows out from the strainer 23. In FIG. 5, the two-dot chain line schematically indicates the flow of the urea aqueous solution.

The urea aqueous solution is supplied from the attaching portion 231 side to the strainer body 23a. The urea aqueous solution is supplied at a flow rate of 40 liters/minute (L/min), maximum. Even when the urea aqueous solution is supplied at the maximum rate, when the urea aqueous solution runs into the front end portion 23b, the urea aqueous solution is introduced into the screen portion 234, and flows out from the screen portion 234 so as to spread to the outside (blow-back does not occur).

According to the present embodiment, with the provision of the strainer 23, it is possible to reduce a replacement frequency of the filter 51 provided inside the urea aqueous solution tank 2. Further, the front end portion 23b formed using a material through which the urea aqueous solution cannot pass is provided to the front end of the strainer 23, making it possible to make the urea aqueous solution flow out from the side surface of the strainer 23 and not return in a direction of the attaching portion 231. This makes it possible to prevent blow-back of the urea aqueous solution.

For example, when a screen portion is provided so as to cover the hole of the front end tube 232 of the strainer body 23a and the front end portion 23b is not provided, the urea aqueous solution, when supplied at a flow rate of 40 L/min, comes into contact with the screen portion that covers the hole of the front end tube 232 and returns in the direction of the attaching portion 231, causing blow-back of the urea aqueous solution. In this case, the sensor provided to the water supply gun 100 may operate, causing the water supply to stop (an auto stop operation).

In contrast, when the front end portion 23b is provided as in the present embodiment, blow-back of the urea aqueous solution can be prevented, making it possible to ensure that an auto stop operation does not occur.

Further, according to the present embodiment, the urea aqueous solution is introduced into the screen portion 234 and flows out from the wide surface area of the screen portion 234, making it possible to make the mesh of the screen portion 234 finer.

For example, when a screen portion is provided so as to cover the hole of the front end tube 232 of the strainer body 23a, blow-back of the urea aqueous solution occurs when the urea aqueous solution is supplied at a flow rate of 40 L/min unless the filtration precision is about 300 μm, for example. Conversely, when the front end portion 23b is provided, the filtration precision can be increased to about 95 μm (the mesh can be made finer). Thus, it is possible to increase the effect of reducing the replacement frequency of the filter 51 provided inside the urea aqueous solution tank 2.

Second Embodiment

While the front end portion 23b formed using a material through which the urea aqueous solution cannot pass is integrally formed with the front end tube 232 so as to protrude toward the hollow portion of the strainer body 23a in the first embodiment, the embodiment of the front end portion is not limited thereto.

Figure 6:
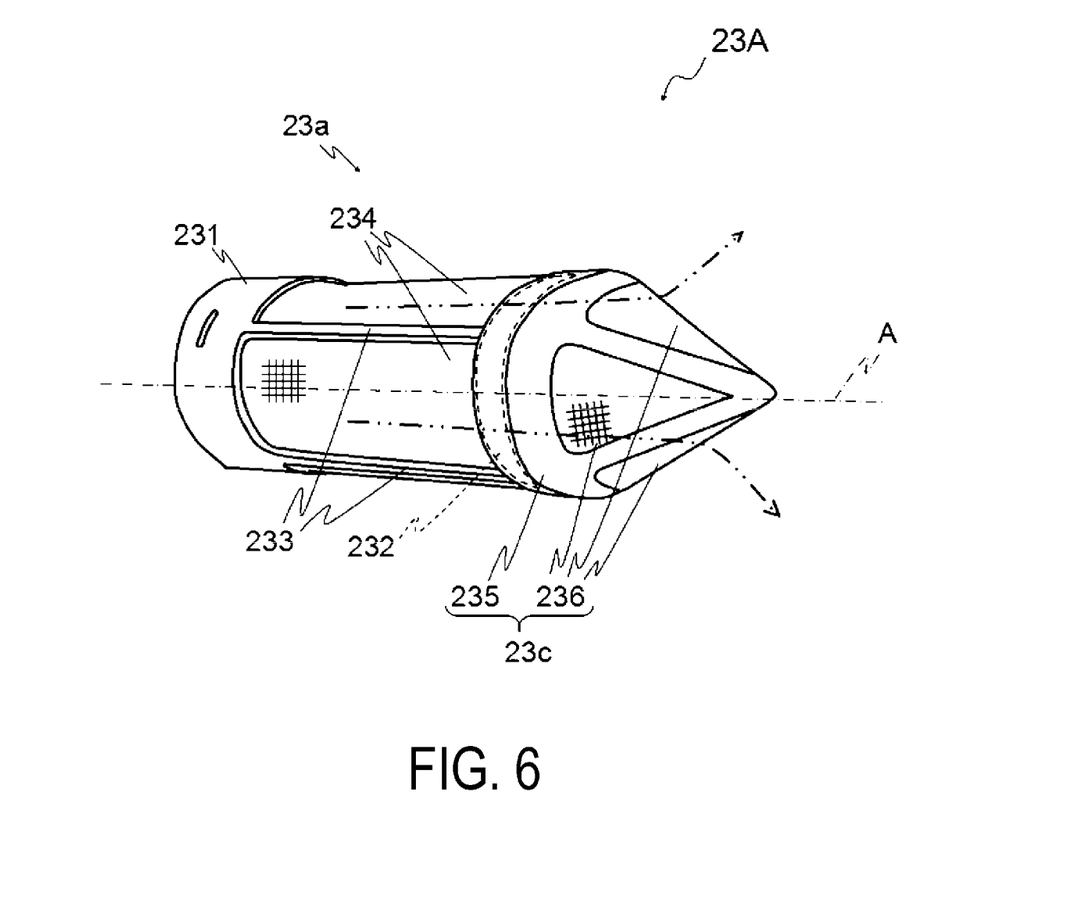
FIG. 6 is a perspective view illustrating an overview of a strainer 23A used in the urea-SCR system according to a second embodiment.

FIG. 6 is a perspective view illustrating an overview of a strainer 23A used in the urea-SCR system according to a second embodiment. The difference between the first embodiment and the second embodiment is whether the strainer 23 or the strainer 23A is used, and thus only the strainer 23A will be described below and descriptions of the other components of the urea-SCR system will be omitted.

The strainer 23A mainly includes the strainer body 23a having a substantially cylindrical shape, and a front end portion 23c provided to the strainer body 23a.

The front end portion 23c is integrally formed with the front end tube 232 so as to protrude toward the side opposite to the strainer body 23a. The front end portion 23c has a substantially truncated cone shape, and a cross section thereof taken along the plane including the center axis A of the strainer 23 has a substantially triangular shape.

The front end portion 23c includes a frame 235 formed using a material (a resin, for example) through which the urea aqueous solution cannot pass, and a screen portion 236 formed using a material through which the urea aqueous solution can pass (a fabric-like member obtained by weaving a wire material made from a resin into a mesh shape, for example). As a result, the urea aqueous solution flows out from the screen portion 236 of the front end portion 23c so as to spread in a normal direction (refer to the two-dot chain line in FIG. 6).

According to the present embodiment, with the provision of the strainer 23A, it is possible to reduce the replacement frequency of the filter 51 provided inside the urea aqueous solution tank 2. Further, the front end portion 23c is provided to a front end of the strainer 23A, making it possible to make the urea aqueous solution flow out from the front end portion 23c and not return in the direction of the attaching portion 231. As a result, blow-back of the urea aqueous solution can be prevented.

Third Embodiment

While the front end portion 23b formed using a material through which the urea aqueous solution cannot pass has a substantially triangular shape when a cross section is taken along a plane including the center axis A of the strainer 23 in the first embodiment, the embodiment of the front end portion is not limited thereto.

Figure 7:
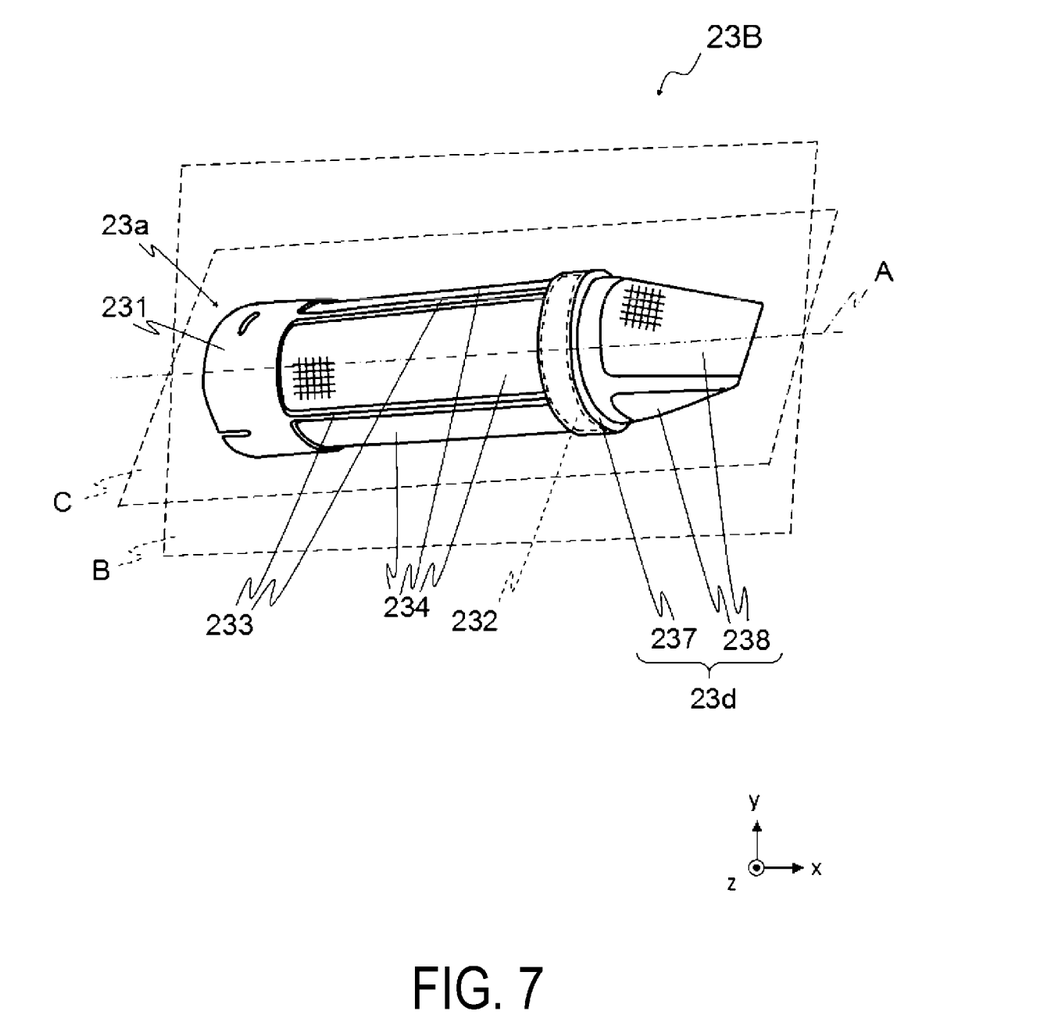
FIG. 7 is a perspective view illustrating an overview of a strainer 23B used in the urea-SCR system according to a third embodiment.

FIG. 7 is a perspective view illustrating an overview of a strainer 23B used in the urea-SCR system according to a third embodiment. The difference between the first embodiment and the third embodiment is whether the strainer 23 or the strainer 23B is used, and thus only the strainer 23B will be described below and descriptions of the other components of the urea-SCR system will be omitted.

The strainer 23B mainly includes the strainer body 23a having a substantially cylindrical shape, and a front end portion 23d provided to the strainer body 23a.

The front end portion 23d is integrally formed with the front end tube 232 so as to protrude toward the side opposite to the strainer body 23a.

The front end portion 23d has a substantially triangular shape when a cross section is taken along a plane B including the center axis A of the strainer body 23a, and a substantially trapezoidal shape when a cross section is taken along a plane C including the center axis A of the strainer body 23a. That is, the base (end on the side integrally formed with the front end tube 232) of the front end portion 23d has a substantially circular shape, and the front end has a rod shape.

The front end portion 23d includes a frame 237 formed using a material (a resin, for example) through which the urea aqueous solution cannot pass, and a screen portion 238 formed using a material through which the urea aqueous solution can pass (a fabric-like member obtained by weaving a wire material made from a resin into a mesh shape, for example). The urea aqueous solution flows out from the surface of the screen portion 238 of the front end portion 23d so as to spread in the normal direction.

According to the present embodiment, with the provision of the strainer 23B, it is possible to reduce the replacement frequency of the filter 51 provided inside the urea aqueous solution tank 2. Further, the front end portion 23d is provided to a front end of the strainer 23B, making it possible to make the urea aqueous solution flow out from the front end portion 23d and not return in the direction of the attaching portion 231. As a result, blow-back of the urea aqueous solution can be prevented.

Embodiments of the invention have been described in detail with reference to the drawings; however, specific configurations are not limited to the embodiments, and changes in the design or the like are also included within a scope which does not depart from the gist of the invention. A person skilled in the art can easily modify, add, and convert each element in the above embodiments as appropriate.

Further, in the present invention, "substantially/approximately" is a concept that includes variation or modification to the extent that sameness is not lost, and does not only mean strictly the same. For example, a substantially cylindrical shape is a concept that includes an elliptical shape having a cross section close to a circle, for example, and is not strictly limited to a cylindrical shape (a cross section that is circular). Further, a shape simply expressed as cylindrical, for example, includes "substantially cylindrical," and does not only mean strictly cylindrical. Furthermore, the meaning of the term "near" in the present invention includes a region of a range (which can be determined as desired) near a position serving as a reference. For example, "near A" refers to a region of a range near A, and is a concept indicating that A may or may not be included.

REFERENCE SIGNS LIST

1 Urea-SCR system
2 Urea aqueous solution tank
3 Pump
4 Injection nozzle
21 Tank body
22 Injection pipe
22a Front end
23, 23A, 23B Strainer
23b, 23c, 23d Front end portion
24 Sensor unit
25 Cap
51, 52, 53, 54 Filter
100 Water supply gun
101 Exhaust pipe
231 Attaching portion
232 Front end tube
233 Pillar portion
233a Pillar
233b Rib
234, 236, 238 Screen portion
235, 237 Frame

The invention claimed is:

1. A strainer for an injection pipe that serves as an injection opening through which a liquid containing a reducing agent is injected into a tank body, the strainer comprising:
a strainer body having a substantially cylindrical shape, wherein the strainer body comprises a first screen portion that allows the liquid to pass through; and
a front end portion integrally formed with an end of the strainer body on a side and having a substantially triangular or substantially trapezoidal shape when a cross section is taken along a plane including an axis of the strainer body.

2. The strainer according to claim 1, wherein
the front end portion is formed using a material through which the liquid cannot pass and protruding toward a hollow portion of the strainer body.

3. The strainer according to claim 1, wherein the front end portion comprises:
a frame formed using a material through which the liquid cannot pass; and
a second screen portion formed using a material through which the liquid can pass, and is formed protruding to a side opposite to the strainer body.

4. An injection pipe that serves as an injection opening through which a liquid containing a reducing agent is injected into a tank body, the injection pipe comprising a strainer,
wherein the strainer comprises:
a strainer body having a substantially cylindrical shape, wherein the strainer body comprises a first screen portion that allows the liquid to pass through; and
a front end portion integrally formed with an end of the strainer body on a side, and having a substantially triangular or substantially trapezoidal shape when a cross section is taken along a plane including an axis of the strainer body.

5. The injection pipe according to claim 4, wherein
the front end portion is formed using a material through which the liquid cannot pass and protruding toward a hollow portion of the strainer body.

6. The injection pipe according to claim 4, wherein
the front end portion comprises a frame formed using a material through which the liquid cannot pass; and
a second screen portion formed using a material through which the liquid can pass, and is formed protruding to a side opposite to the strainer body.

* * * * *